United States Patent [19]

Schieve

[11] Patent Number: 5,423,029
[45] Date of Patent: Jun. 6, 1995

[54] CIRCUIT AND METHOD FOR TESTING DIRECT MEMORY ACCESS CIRCUITRY

[75] Inventor: Eric W. Schieve, Austin, Tex.

[73] Assignee: Dell USA, L.P., Austin, Tex.

[21] Appl. No.: 60,391

[22] Filed: May 11, 1993

[51] Int. Cl.⁶ .................. G01R 31/28; G06F 11/00
[52] U.S. Cl. .................... 395/575; 371/21.2
[58] Field of Search ............ 395/575, 275, 425; 371/15.1, 16.1, 21.2; 364/242.3

[56] References Cited

U.S. PATENT DOCUMENTS 5,161,162  11/1992  Watkins et al. ............ 371/29.5
5,313,626  5/1994  Jones et al. ............ 395/575

*Primary Examiner*—Charles E. Atkinson
*Attorney, Agent, or Firm*—David Hitt; David McCombs; James Huffman

[57] ABSTRACT

Disclosed are an apparatus and method for testing a direct memory access ("DMA") controller. The apparatus comprises (1) a virtual control device including a virtual control latch, the virtual control device coupled to a request input of the DMA controller and capable of transmitting a signal to the DMA controller representing a request to transfer data and (2) a virtual input/output ("I/O") device including a virtual I/O latch, an acknowledgement output of the DMA controller coupled to the virtual I/O device, the virtual I/O latch capable of storing the data for use by the DMA controller. In its preferred embodiment, the present invention operates within the confines of IBM-compatible personal computer architecture, allowing DMA controller functionality to be tested directly.

32 Claims, 2 Drawing Sheets

CIRCUIT AND METHOD FOR TESTING DIRECT MEMORY ACCESS CIRCUITRY

TECHNICAL FIELD OF THE INVENTION

The present invention is directed in general to computer diagnostics and, more specifically, to a diagnostics circuit and method for testing direct memory access circuitry within the limited architecture of a personal computer.

Computers are constantly involved with the task of data, both from one location to another in the computer's primary storage (or "main memory") and to and from input/output ("I/O") devices such as floppy and hard disk drives coupled to the computer. Before the advent of direct memory access ("DMA"), the central processing unit ("CPU") of the computer was intimately involved each time data needed to be moved, reading and writing each piece of data to be moved. The CPU thus became a data bottleneck in the computer, decreasing overall computer performance and tying up the CPU's processing resources in the relatively mundane task.

To solve the above-noted problem, computers are equipped with DMA under control of a DMA controller. It is the job of the DMA controller to, under instruction of the CPU, move data to and from main memory and to and from I/O devices. To accomplish a DMA transfer, the CPU provides an instruction to the DMA controller representing the source and destination of the data to be transferred, the source and the destination being within main memory or in an I/O device. The DMA controller then handles the details of the transfer, managing address, data and control buses to actually move the data byte-by-byte or block-by-block. Thus, development of DMA controllers represents a quantum leap in computer capability, freeing the CPU to perform more vital computational tasks and, in general, significantly speeding things up.

In IBM-compatible personal computers, DMA controllers are not used to their full capability. Standard IBM-compatible personal computers employ generic DMA controller chips capable, as stated above, of doing data transfers from memory, to memory, and between memory and I/O devices. However, IBM-compatible personal computers do not take advantage of the DMA controller's capacity to do memory-to-memory transfers. The DMA controller, instead, is used for providing communication between the CPU and peripheral devices, namely the floppy disk drive. In fact, the IBM-compatible personal computer architecture provides a dedicated DMA controller channel (channel 2) between the DMA controller and the floppy drive controller to allow the DMA controller to transfer data to and from the floppy drive.

Computer diagnostic routines consist of a series of instructions executed by the computer's CPU to allow self-diagnosis. For years, computers have been provided with diagnostic routines that test and report on the operational status or functionality of components within the computer, allowing a user to repair or replace components that are not functioning to a desired degree.

Thorough diagnosis of computer faults being the key objective of con, purer diagnostics, it is highly desirable to test the DMA controller to determine whether it is transferring data accurately and completely.

DMA controllers can be tested either indirectly or directly. A DMA controller is tested indirectly by observing devices in communication with the DMA controller during a data transfer to determine whether they are acting as they should. A DMA controller is tested directly by directing it to perform a data transfer and comparing the data transferred to determine whether it has been transferred successfully. Direct testing can be accomplished with a memory-to-memory transfer or with a transfer between main memory and an I/O controller. Direct testing is preferable to indirect testing because direct observation of the DMA controller in action allows more accurate diagnosis.

As stated above, IBM-compatible computers are not structured to allow the DMA controller to perform memory-to-memory transfers. Thus, direct testing of a DMA controller in such computers must be done via a data transfer between main memory and an I/O controller, specifically, the dedicated channel 2 between the DMA controller and the floppy disk controller, actually having the DMA controller perform a series of read/write operations to the floppy disk controller.

Unfortunately, IBM-compatible personal computer architecture does not allow the DMA controller to access the floppy drive controller in isolation, to thereby allow direct DMA controller testing. Instead, to test the DMA controller, the DMA controller must make physical accesses to a floppy disk, requiring one to insert a floppy disk for test purposes, the DMA controller performing read/write operations through the floppy drive controller to the floppy disk. This is how prior art IBM-compatible personal computers provide for indirect testing of the DMA controller.

A failure within the DMA controller itself, the floppy drive controller, the floppy disk drive, the floppy disk media, or any of the cables connecting these components can affect the outcome of this indirect DMA controller test. Thus, such an indirect testing procedure does not have sufficient fault isolation. One can not be assured that a fault detected by prior art indirect testing originates in the DMA controller. What is needed in the art is a method of directly testing a DMA controller within a personal computer architecture that does not depend on the floppy drive controller, the floppy drive or, for that matter, any real peripheral device.

SUMMARY OF THE INVENTION

It is therefore a primary object of the present invention to provide a circuit and method for directly testing a DMA controller in a personal computer without requiring the DMA controller to interact with a real peripheral device, specifically, the floppy disk drive.

In the attainment of the above-noted primary objective, the present invention provides a testing circuit for a DMA controller comprising (1) a virtual control device including a virtual control latch, the virtual control device coupled to a request input of the DMA controller and capable of transmitting a signal to the DMA controller representing a request to transfer data and (2) a virtual input/output (I/O) device including a virtual I/O latch, an acknowledgement output of the DMA controller coupled to the virtual I/O device, the virtual I/O latch capable of storing the data for use by the DMA controller.

For purposes of the present invention, "virtual" is defined as simulated in software or hardware, as opposed to "real."

A feature of the present invention is to embody the virtual control device and the virtual I/O device in a relatively inexpensive, versatile, general purpose device. Accordingly, in a preferred embodiment of the present invention, the virtual control device and the virtual I/O device are embodied in a programmable logic array ("PAL"). This is in contrast to embodying the two devices in custom chips which, although workable and within the scope of the present invention, would result in a more expensive testing circuit. The control device and I/O device are virtual because they are simulated in the PAL, not real control and I/O devices, such as the floppy controller and floppy disk drive they replace during testing.

Another object of the present invention is to test the DMA controller without having to remove it from the personal computer. Thus, the present invention is adapted to take advantage of the computer's existing data handling and addressing hardware. Accordingly, in the present invention, the virtual control device and the virtual I/O device are coupled to a data bus, an address bus and a control bus within the computer, allowing the computer's CPU to communicate with the devices. Likewise, the DMA controller, which normally communicates via the buses, remains coupled to the buses during testing.

The DMA controller must provide an acknowledgement signal to both the virtual control device and the virtual I/O device during testing. Accordingly, in the present invention, the acknowledgement output is coupled to the virtual I/O device via a multiplexer ("mux") to allow communication with both of the devices in a time-division fashion. The mux allows the DMA controller to clear the virtual control latch of the request to transfer data.

Of course, since it is an object to test the DMA controller without removing it from the computer, the DMA controller is selectably coupled to a real I/O device for communication therewith. In fact, in personal computers, the DMA controller is coupled to the floppy disk drive via the floppy disk controller. The DMA controller is decoupled from a real I/O device while the testing circuit is in use. This prevents the signals generated during testing from entering and interfering with the floppy disk controller.

In the attainment of the above-described objects, a preferred embodiment of the present invention also encompasses a method of testing a DMA controller in a personal computer, comprising the steps of (1) decoupling the DMA controller from a real input/output (I/O) device, (2) loading a first value from a data bus into the DMA controller, the first value representing a type of transfer the DMA controller is to perform, (3) loading a second value from a data bus into a virtual control latch within a virtual control device, the second value representing a transfer request to be transmitted to a request input on the DMA controller, (4) loading a third value from the data bus into a virtual I/O latch within a virtual I/O device, the third value representing data to be transferred by the DMA controller, (5) transmitting the second value to the request input on the DMA controller, the DMA controller transmitting an acknowledgement signal to (a) the virtual control device to clear the second value and (b) the virtual I/O device to select the virtual I/O device, (6) transmitting a read/write signal from the data bus to the virtual I/O device, the read/write signal placing the data on the data bus, the DMA controller transferring the data to memory coupled to the data bus and (7) comparing the data with a content of the memory following the DMA controller transfer of the data to the memory, the DMA controller deemed to function properly if the data matches the content of the memory.

The foregoing has outlined rather broadly the features and technical advantages of the present invention so that the detailed description of the invention that follows may be better understood. Additional features and advantages of the invention will be described hereinafter and also constitute the subject of the claims of the present invention. Those skilled in the art should appreciate that the conception and the specific embodiment disclosed may be readily used as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
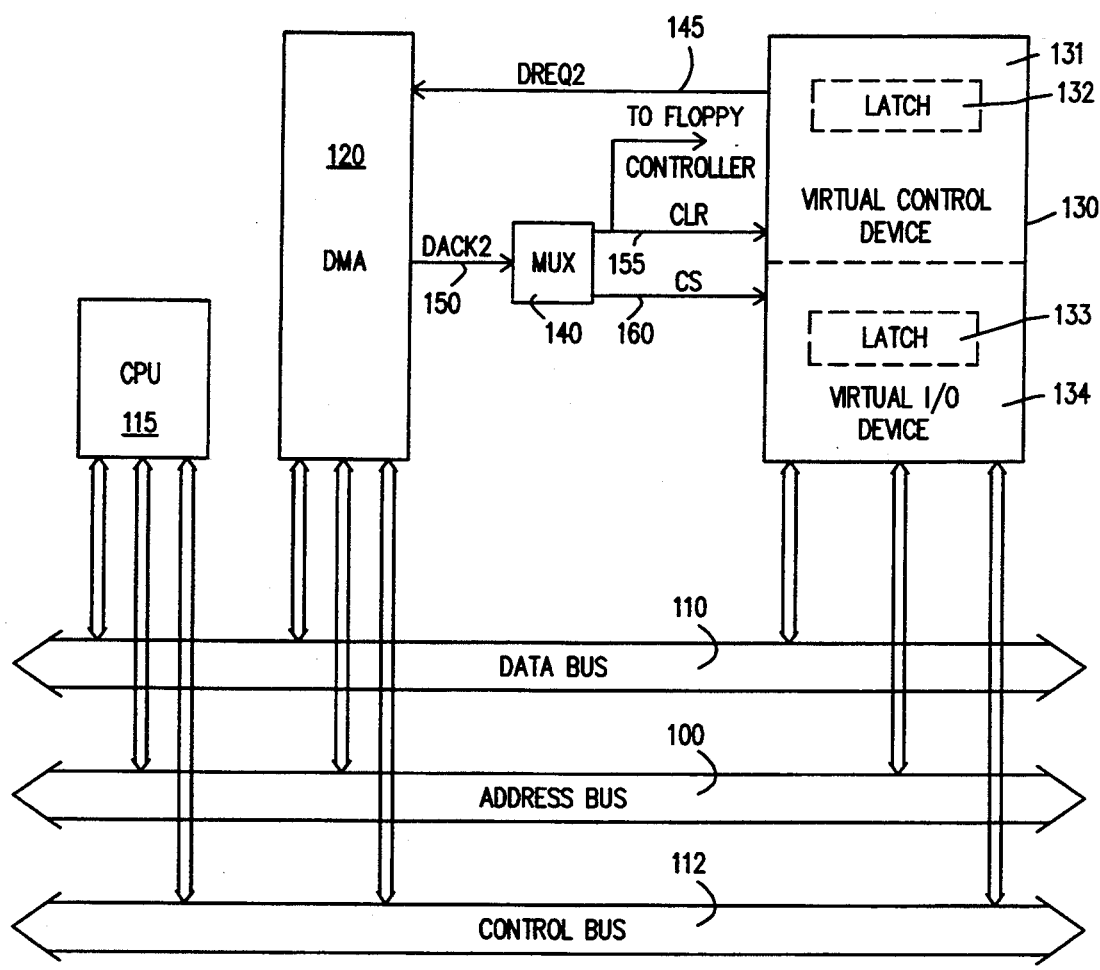
FIG. 1 illustrates a partial block diagram of a personal computer.

FIG. 1 illustrates a partial block diagram of a personal computer. Shown are an address bus 100, a data bus 110, a control bus 112, a microprocessor CPU 115 coupled to the buses 100, 110, 112, a DMA controller 120 coupled to the buses 100, 110, 112, a programmable logic array ("PAL") 130 coupled to the buses 100, 110, 112 and a 1:2 time-division multiplexer ("mux") 140 coupled between the DMA controller 120 and the PAL 130.

The DMA controller 120 and the PAL 130 are able to communicate with the buses 100, 110, 112 to share data, address and control information therewith. A "DREQ2" line 145 couples a pin (not shown) on the PAL 130 with a "DREQ2" pin (not shown) on the DMA controller 120. The "DREQ2" line 145 allows the PAL 130 to request the DMA controller 120 to initiate a data transfer. A "DACK2" line 150 runs from a "DACK2" pin (not shown) on the DMA controller 120 to the mux 140. The "DACK2" line 150 allows the DMA controller 120 to acknowledge any request sent along the "DREQ2" line 145.

The mux 140 provides any signal sent along the "DACK2" line 150 to the PAL 130 to two virtual locations in a time-division fashion to be explained later. This is accomplished via a "clear" ("CLR") line 155 and a "chip select" ("CS") line 160. The "CLR" line 155 also goes, as shown, to a real control latch on a floppy controller to allow the DMA controller 120 to actually transfer data between main memory and the floppy drive when the DMA controller 120 is not under test.

During testing, the "CLR" line 155 to the floppy controller (not shown) is disabled. As previously mentioned, the DMA controller is decoupled from the floppy controller to prevent signals from entering and interfering with operation of the floppy controller. Thus, the floppy controller and its associated real control latch are not shown in FIG. 1 because they are conventional and are disconnected from the DMA controller 120 during testing. After testing of the DMA controller is completed, the DMA controller is recoupled to the floppy controller to allow diagnostic testing of the controller itself or to allow for normal operation of the personal computer.

The PAL 130 is a typical, off-the-shelf PAL. PALs allow one to design a circuit in generic hardware that would otherwise have to be embodied in custom-designed circuitry. Those ordinarily skilled in the art are aware of PALs, their functioning and the way they are programmed to produce a desired circuit.

The fact that the virtual control device and the virtual I/O device are embodied in a PAL is irrelevant to the nature of the invention. The invention can, instead, be embodied in a custom integrated circuit or in a software-programmed microprocessor substituted for the PAL. The principal concept embodied in the present invention is the substitution of virtual control and I/O devices for the real ones (in this case, the floppy controller).

Thus, the scope of the present invention is not limited to PAL embodiments, but extends to use of virtual devices in whatever form to test DMAs. The manner in which one must program the PAL 130 to perform the indicated functions is obvious to one of ordinary skill in the art given the structure and functions the PAL is to perform as disclosed herein.

The PAL 130 is, in the preferred embodiment, programmed to emulate a virtual control device 131 and a virtual I/O device 134. These separate functions are represented by a dashed line separating the virtual control device 131 from the virtual I/O device 134. The virtual control device 131 includes a virtual control latch 132 (also shown in dashed-line). The virtual control latch 132 acts as a control register and a means by which a request-to-transfer signal can be loaded on the "DREQ2" line 145. The virtual I/O device 134 comprises a virtual I/O latch 133. During testing, the DMA controller 120 transfers data from the PAL 130 as though the PAL 130 were a floppy disk drive and its associated controller. That data is loaded into the virtual I/O latch 133, allowing the data to be subsequently read onto the data bus 110 to confirm operation of the DMA controller 120 in a manner that will be explained in more detail in conjunction with FIG. 2.

In the preferred embodiment of the present invention, the DMA controller 120 is an Intel 8237A high performance programmable DMA controller that is able to operate at frequencies of between 3 and 5 MHz, depending upon version. The 8237A multimode DMA controller is a peripheral interface circuit for microprocessor systems. It is designed to improve system performance by allowing external devices to directly transfer information from the system memory. The 8237A also provides memory-to-memory transfer capability. The 8237A an 8-bit data device. Therefore, virtual I/O latch 133, in the preferred embodiment, is an 8-bit latch. The 8237A contains four independent channels and may be expanded to any number of channels by cascading additional controller chips.

The 8237A provides three basic transfer modes that allow programmability of the types of DMA controller service by a user. The 8237A provides, on each chip, four independent DMA controller channels. Each channel can be individually programmed to autoinitialize to its original condition. The present invention is described in terms of testing DMA controller channel 2. The present invention can be configured to test all four channels of the DMA controller 120 or any number of channels of cascaded DMAs.

As previously discussed, the personal computer architecture makes use of the DMA controller to only a limited extent. Off-the-shelf DMAs feature multiple channels and are able to transfer data between memory in the computer and an I/O device or back and forth within the memory. Specifically, personal computers only make use of DMA controller channel 2 to transfer data to and from the floppy disk controller. However, the present invention is not limited to testing channel 2 or any one channel in particular. Therefore, since the DMA controller comprises a plurality of channels, the testing circuit is capable of testing each and every one of the plurality of channels.

The present invention is designed to operate as one of a series of diagnostic routines that test the whole computer. Sound diagnostic theory dictates that a diagnostic test should avoid relying on the proper functioning of a component that has not been tested. Thus, diagnostic routines are preferably designed to test the core of the computer first: the CPU and hardware adjacent the CPU, such as the real-time clock and interrupt handlers. Next, after these core components are tested, diagnostic routines should address the cache memory subsystem, the main memory subsystem, the video subsystem, the keyboard and disk drives. Since IBM-compatible computers employ DMA controllers only for floppy disk drive access, the DMA testing circuit and method (as illustrated in FIG. 2) of the present invention come into play in conjunction with testing of the floppy disk drive.

Figure 2:
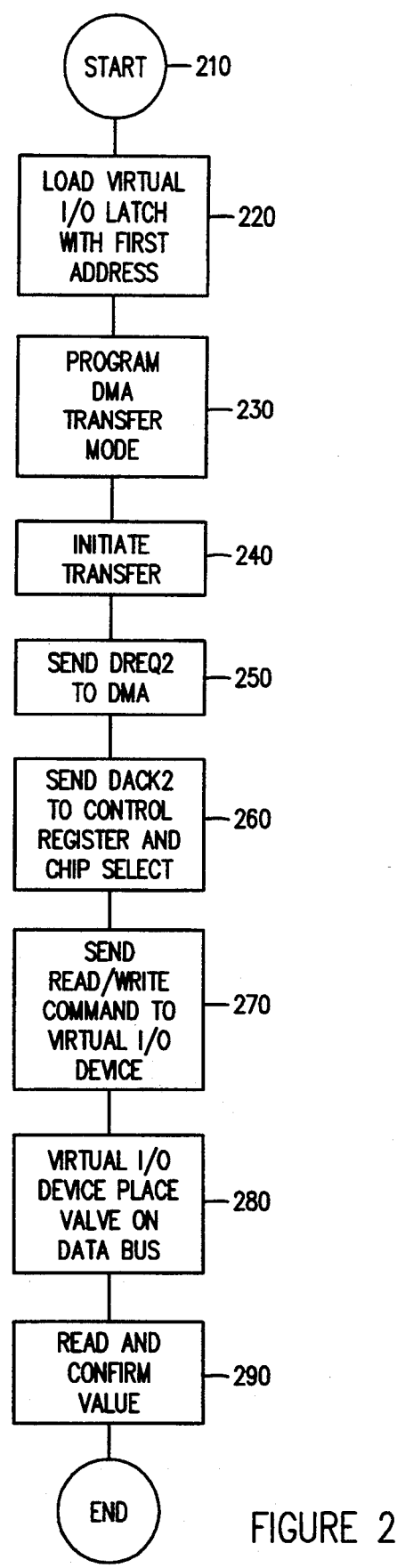
FIG. 2 illustrates a flow diagram of the method performed in the preferred embodiment of the present invention.

Turning now to FIG. 2, illustrated is a flow diagram of the method performed in the preferred embodiment of the present invention. Processing starts in a start block 210. First, a first data is loaded in the virtual I/O latch 133 of FIG. 1 (a block 220). Next, in a block 230, the DMA controller transfer mode is set. This is performed by loading a value into the DMA controller 120 by means of the data bus 110. This value instructs the DMA controller 120 to perform either a write to or a read from the I/O device, in this case the virtual I/O device embodied in the PAL 130. For purposes of the present invention, the value will represent a transfer from the virtual I/O device 134 to main memory.

In a block 240, a DMA transfer is initiated. This is accomplished by loading the virtual control latch 132 with a value, the value setting a bit in the virtual control latch 132 causing a signal to be sent along the "DREQ2" line 145 of FIG. 1 to the DMA controller 120. The DMA controller 120 acts on this request along the "DREQ2" line 145 and, in response thereto, issues an acknowledgment of the request along the "DACK2" line 150 to the mux 140 of FIG. 1. In turn, the mux 140 provides a signal along the "CLR" line 155 and the "CS" line 160 in a time-division fashion (i.e.: a "CLR" signal followed by a "CS" signal) to reset the virtual control latch 132 of the virtual control device 131 to erase the request to transfer and to enable a virtual chip select in the virtual I/O device 134 within the PAL 130. This chip select places the contents of the virtual I/O latch 133 on the data bus 110, enabling a data transfer from the virtual I/O latch 133 to main memory. This is performed in blocks 270 and 280.

Finally, the original contents of the virtual I/O latch 133 are compared with the destination in main memory of the data transfer by the DMA controller 120. If the data have remained intact, then the DMA controller 120 is functional, at least with respect to channel 2. This is performed in a block 290. At this point, execution of the DMA controller testing routine ends, unless it is desired to test other DMA controller channels. From this point, the diagnostics process proceeds to other components, the DMA controller having been declared sound.

Finally, after the present invention has verified the functioning of the DMA controller, other diagnostic routines are free to verify the operation of the real floppy controller and its associated floppy drive or drives. Accordingly, execution proceeds to other diagnostic routines designed to test the floppy controller, floppy drive or drives and other computer circuitry, as required.

From the above disclosure, it is apparent that the present invention is the first to provide a testing circuit for a DMA controller comprising (1) a virtual control device including a virtual control latch, the virtual control device coupled to a request input of the DMA controller and capable of transmitting a signal to the DMA controller representing a request to transfer data and (2) a virtual I/O device including a virtual I/O latch, an acknowledgement output of the DMA controller coupled to the virtual I/O device, the virtual I/O latch capable of storing the data for use by the DMA controller.

Although the present invention and its advantages have been described in detail, it should be understood that various changes, substitutions and alterations can be made herein without departing from the spirit and scope of the invention as defined by the appended claims.

What is claimed is:

1. A testing circuit for a direct memory access (DMA) controller, comprising:
   a virtual control device coupled to a request input of said DMA controller and capable of transmitting a signal to said DMA controller representing a request to transfer data;
   a virtual input/output (I/O) device including a virtual I/O latch, an acknowledgement output of said DMA controller coupled to said virtual I/O device, said virtual I/O latch capable of storing said data for use by said DMA controller ;
   a memory coupled to said DMA controller and said virtual I/O device, said memory capable of storing said data from said virtual I/O latch under control of said DMA controller; and
   a means for comparing said data stored in said virtual I/O latch and a content of said memory.

2. The circuit as recited in claim 1 wherein said virtual control device and said virtual I/O device are embodied in a programmable logic array.

3. The circuit as recited in claim 1, further comprising a data bus and an address bus, wherein said virtual control device is coupled to said data bus and said address bus.

4. The circuit as recited in claim 1, further comprising a data bus and an address bus, wherein said DMA controller is coupled to said data bus and said address bus.

5. The circuit as recited in claim 1 wherein said acknowledgement output is coupled to said virtual I/O device via a multiplexer (mux).

6. The circuit as recited in claim 1 wherein said acknowledgement output is coupled to said virtual control device via a multiplexer (mux), said mux allowing said DMA controller to clear said request to transfer data.

7. The circuit as recited in claim 1, further comprising a real I/O device and a means for selectably coupling said DMA controller to said real I/O device for communication therewith.

8. The circuit as recited in claim 1, further comprising a real I/O device and a means for selectably coupling said DMA controller to said real I/O device, wherein said DMA controller is decoupled from said real I/O device while said testing circuit is in use.

9. The circuit as recited in claim 1 wherein said DMA controller comprises a plurality of channels, further comprising a means for selecting each of said plurality of said channels, said testing circuit capable of testing each of said plurality of channels.

10. A method of testing a direct memory access (DMA) controller, comprising the steps of:
    transmitting a first signal from a virtual control latch within a virtual control device to a request input of said DMA controller, said first signal representing a request to said DMA controller to transfer data;
    placing data stored in a virtual input/output (I/O) latch within a virtual I/O device onto a data bus to allow said DMA controller to transfer said data;
    transferring said data under control of said DMA controller to a memory; and
    comparing a content of said memory following DMA controller transfer of said data with said data stored in said virtual input/output (I/O) latch, said DMA controller deemed to function properly if said data matches said content of said memory.

11. The method as recited in claim 10 further comprising the step of decoupling said DMA controller from a real input/output (I/O) device prior to said step of transmitting.

12. The method as recited in claim 10 further comprising the step of loading a first value from a data bus into said DMA controller, said first value representing a type of transfer said DMA controller is to perform, said step of loading performed prior to said step of transmitting.

13. The method as recited in claim 10 further comprising the step of loading a second value from a data bus into said virtual control latch, said second value providing a basis for transmission of said first signal.

14. The method as recited in claim 10 further comprising the step of loading a third value from said data bus into said virtual I/O latch, said third value representing said data.

15. The method as recited in claim 10 further comprising the step of transmitting an acknowledgement signal from said DMA controller to (1) said virtual control device to clear said first signal and (2) said virtual I/O device to select said virtual I/O device.

16. The method as recited in claim 10 further comprising the step of transmitting a read/write signal to said virtual I/O device, said read/write signal placing said data on said data bus, said DMA controller transferring said data to said memory coupled to said data bus.

17. The method as recited in claim 10 wherein said DMA controller communicates with said virtual control device and said virtual I/O device via a multiplexer (mux).

18. The method as recited in claim 10 wherein said DMA controller comprises a plurality of channels, said testing circuit capable of testing each of said plurality of channels.

19. A personal computer, comprising:
   a direct memory access (DMA) controller said DMA controller having a DMA controller channel with a request input and an acknowledgement output;
   a data bus and an address bus, said data bus and said address bus coupled to said DMA controller for communication therewith;
   a virtual control device including a virtual control latch, said virtual control device coupled to said address bus and capable of receiving a signal to be loaded into said virtual control latch representing a transfer request to be transmitted via a line coupling said virtual control latch to said request input;
   a multiplexer (mux) having a mux input coupled to said acknowledgement output and a first mux output coupled to a "clear" input on said virtual control device; and
   a virtual input/output (I/O) device including a virtual I/O latch, said virtual I/O device coupled to said data bus and capable of receiving a signal to be loaded into said virtual I/O latch representing data to be transferred by said DMA controller, a second mux output being coupled to a "chip select" input on said virtual I/O device.

20. The computer as recited in claim 19 wherein said virtual control device and said virtual I/O device are embodied in a programmable logic array.

21. The computer as recited in claim 19, further comprising a real I/O device and a means for selectably coupling said DMA controller to said real I/O device for communication therewith.

22. The computer as recited in claim 19, further comprising a real I/O device and a means for selectably coupling said DMA controller to said real I/O device, wherein said DMA controller is decoupled from said real I/O device while said virtual control device and said virtual I/O device are in use.

23. The computer as recited in claim 19 wherein said DMA controller comprises a plurality of channels, a means for selectably coupling each of said plurality of channels to said virtual control device and said virtual I/O device.

24. A method of testing a direct memory access (DMA) controller in a personal computer, comprising the steps of:
   decoupling said DMA controller from a real input/output (I/O) device;
   loading a first value from a data bus into said DMA controller, said first value representing a type of transfer said DMA controller is to perform;
   loading a second value from said data bus into a virtual control latch within a virtual control device, said second value representing a transfer request to be transmitted to a request input on said DMA controller;
   loading a third value from a data bus into a virtual I/O latch within a virtual I/O device, said third value representing data to be transferred by said DMA controller;
   transmitting said second value to said request input on said DMA controller, said DMA controller transmitting an acknowledgement signal to (1) said virtual control device to clear said second value and (2) said virtual I/O device to select said virtual I/O device;
   transmitting a read/write signal to said virtual I/O device, said read/write signal placing said data on said data bus, said DMA controller transferring said data to memory coupled to said data bus; and
   comparing said data with a content of said memory following said DMA controller transfer of said data to said memory, said DMA controller deemed to function properly if said data matches said content of said memory.

25. The method as recited in claim 24 wherein said DMA controller is selectably coupled to a real I/O device for communication therewith.

26. The method as recited in claim 24 wherein said DMA controller is decoupled from a real I/O device while said testing circuit is in use.

27. The method as recited in claim 24 wherein said DMA controller comprises a plurality of channels, said testing circuit capable of testing each of said plurality of channels.

28. The method as recited in claim 24 wherein said virtual control device and said virtual I/O device are embodied in a programmable logic array (PAL).

29. A testing circuit for a direct memory access (DMA) controller, comprising:
   an address bus and a data bus, said address bus and said data bus coupled to said DMA controller;
   a virtual control device including a virtual control latch, said virtual control device coupled to said address bus, said data bus, and to a request input of said DMA controller and capable of transmitting a signal to said DMA controller from said virtual control latch representing a request to transfer data;
   a virtual input/output (I/O) device including a virtual I/O latch, said virtual I/O device coupled to said address bus and said data bus, and to an acknowledgement output of said DMA controller, said virtual I/O latch capable of storing said data for use by said DMA controller;
   a memory coupled to said address bus and said data bus, said memory capable of storing said data from said virtual I/O latch under control of said DMA controller; and
   a means for comparing said data stored in said virtual I/O latch and a content of said memory.

30. The testing circuit as recited in claim 29, further comprising a multiplexer (mux) having an input, a first output and a second output, said acknowledgement output coupled to said input, said first output coupled to a "clear" input on said virtual control device to clear said request to transfer data, and wherein said acknowledgement output is coupled to said virtual control device via said second output.

31. The testing circuit as recited in claim 30, further comprising a real input/output (I/O) device and a means for selectably coupling said DMA controller to said real I/O device.

32. The testing circuit as recited in claim 31, wherein said DMA controller is decoupled from said real I/O device while said testing circuit is in use.

* * * * *